US012744820B2

(12) United States Patent
Crabtree et al.

(10) Patent No.: US 12,744,820 B2
(45) Date of Patent: Sep. 22, 2026

(54) TIME-SERIES GEOSPATIAL DATA SYSTEM FOR WORLD SIMULATION

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 85 days.

(21) Appl. No.: 18/813,475

(22) Filed: Aug. 23, 2024

(65) Prior Publication Data

US 2024/0414209 A1 Dec. 12, 2024

Related U.S. Application Data

(63) Continuation of application No. 18/497,243, filed on Oct. 30, 2023, now Pat. No. 12,081,594, which is a continuation of application No. 17/106,997, filed on Nov. 30, 2020, now Pat. No. 11,979,433, which is a continuation-in-part of application No. 15/931,534, filed on May 13, 2020, now abandoned, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, which is a (Continued)

(51) Int. Cl.

| | |
|---|---|
| ***H04L 9/40*** | (2022.01) |
| ***G06F 16/2458*** | (2019.01) |
| ***G06F 16/951*** | (2019.01) |

(52) U.S. Cl.

CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search

CPC . H04L 63/20; H04L 63/1425; H04L 63/1441; H04L 63/107; G06F 16/2477; G06F 16/951; G06F 16/9024

USPC .......................................................... 726/22

See application file for complete search history.

(56) References Cited

U.S. PATENT DOCUMENTS

| | | | |
|---|---|---|---|
| 6,256,544 | B1 | 7/2001 | Weissinger |
| 7,171,515 | B2 | 1/2007 | Ohta et al. |

(Continued)

FOREIGN PATENT DOCUMENTS

| | | | |
|---|---|---|---|
| WO | 2001063534 | A2 | 8/2001 |
| WO | 2014159150 | A1 | 10/2014 |

(Continued)

*Primary Examiner* — Bryan F Wright
(74) *Attorney, Agent, or Firm* — NK Patent Law

(57) ABSTRACT

A system and method for providing time-series geospatial data and a world-scale simulation platform used to generate simulated-world environments by rendering data-dense geographical regions corresponding to heterogenous sourced data and formats for highly scalable parallel simulations, and comprised of a multi-dimensional time-series database used for enabling query support across multiple simulations via individual simulation and entity swimlanes for cyber, physical and cyber-physical entities and regions.

36 Claims, 8 Drawing Sheets

Related U.S. Application Data continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/931,534 is a continuation-in-part of application No. 15/683,765, filed on Aug. 22, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, said application No. 15/931,534 is a continuation-in-part of application No. 16/718,906, filed on Dec. 18, 2019, now Pat. No. 11,055,140, which is a continuation of application No. 15/879,182, filed on Jan. 24, 2018, now Pat. No. 10,514,954, which is a continuation-in-part of application No. 15/850,037, filed on Dec. 21, 2017, now abandoned, which is a continuation-in-part of application No. 15/673,368, filed on Aug. 9, 2017, now abandoned, which is a continuation-in-part of application No. 15/376,657, filed on Dec. 13, 2016, now Pat. No. 10,402,906, said application No. 15/850,037 is a continuation-in-part of application No. 15/489,716, filed on Apr. 17, 2017, now abandoned, which is a continuation-in-part of application No. 15/409,510, filed on Jan. 18, 2017, now abandoned, said application No. 15/931,534 is a continuation-in-part of application No. 15/905,041, filed on Feb. 26, 2018, now Pat. No. 10,706,063, which is a continuation-in-part of application No. 15/237,625, filed on Aug. 15, 2016, now Pat. No. 10,248,910, said application No. 15/931,534 is a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, said application No. 15/931,534 is a continuation-in-part of application No. 16/654,309, filed on Oct. 16, 2019, now abandoned, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962, said application No. 15/847,443 is a continuation-in-part of application No. 15/616,427, filed on Jun. 7, 2017, now abandoned, and a continuation-in-part of application No. 15/489,716, filed on Apr. 17, 2017, now abandoned, said application No. 15/931,534 is a continuation-in-part of application No. 16/660,727, filed on Oct. 22, 2019, now Pat. No. 10,938,683, which is a continuation of application No. 15/229,476, filed on Aug. 5, 2016, now Pat. No. 10,454,791, which is a continuation-in-part of application No. 15/206,195, filed on Jul. 8, 2016, now abandoned.

(60) Provisional application No. 62/568,298, filed on Oct. 4, 2017, provisional application No. 62/568,291, filed on Oct. 4, 2017.

(56) References Cited

U.S. PATENT DOCUMENTS

| | | | | |
|---|---|---|---|---|
| 7,636,917 | B2 | 12/2009 | Darling et al. | |
| 7,693,812 | B2 | 4/2010 | Lim et al. | |
| 7,853,582 | B2 | 12/2010 | Gopalakrishnan | |
| 8,132,260 | B1 | 3/2012 | Mayer et al. | |
| 8,156,029 | B2 | 4/2012 | Szydlo | |
| 8,274,506 | B1 * | 9/2012 | Rees | G06T 15/04 345/419 |
| 8,281,121 | B2 | 10/2012 | Nath et al. | |
| 8,335,754 | B2 | 12/2012 | Dawson et al. | |
| 8,352,347 | B2 | 1/2013 | Howard et al. | |
| 8,516,594 | B2 | 8/2013 | Bennett et al. | |
| 8,600,709 | B2 | 12/2013 | Guild et al. | |
| 8,612,208 | B2 | 12/2013 | Cooper et al. | |
| 8,615,800 | B2 | 12/2013 | Baddour et al. | |
| 8,775,570 | B2 | 7/2014 | Sandholm | |
| 8,793,758 | B2 | 7/2014 | Raleigh et al. | |
| 8,914,878 | B2 | 12/2014 | Burns et al. | |
| 8,990,826 | B2 | 3/2015 | Varma et al. | |
| 9,147,272 | B2 | 9/2015 | Ingrassia et al. | |
| 9,251,487 | B2 | 2/2016 | Black et al. | |
| 9,253,015 | B2 | 2/2016 | Girard | |
| 9,350,792 | B2 | 5/2016 | Carroll et al. | |
| 9,541,982 | B2 | 1/2017 | Lipasti et al. | |
| 9,594,791 | B2 | 3/2017 | Bell et al. | |
| 9,602,530 | B2 | 3/2017 | Ellis et al. | |
| 9,654,495 | B2 | 5/2017 | Hubbard et al. | |
| 9,686,646 | B1 * | 6/2017 | Pecard | G01S 19/13 |
| 9,747,390 | B2 | 8/2017 | Cooper et al. | |
| 9,762,443 | B2 | 9/2017 | Dickey | |
| 9,771,225 | B2 | 9/2017 | Stone et al. | |
| 9,887,933 | B2 | 2/2018 | Lawrence, III | |
| 9,894,633 | B2 | 2/2018 | Hobbs et al. | |
| 9,934,027 | B2 | 4/2018 | Shine et al. | |
| 9,948,514 | B2 | 4/2018 | Kansal et al. | |
| 10,057,122 | B1 | 8/2018 | Andersen et al. | |
| 10,057,775 | B2 | 8/2018 | Raleigh et al. | |
| 10,061,635 | B2 | 8/2018 | Ellwein | |
| 10,097,621 | B2 | 10/2018 | Jung et al. | |
| 10,127,324 | B2 | 11/2018 | Ding et al. | |
| 10,217,348 | B2 | 2/2019 | Poder et al. | |
| 10,248,910 | B2 | 4/2019 | Crabtree et al. | |
| 10,298,678 | B2 | 5/2019 | Castro et al. | |
| 10,367,829 | B2 | 7/2019 | Huang et al. | |
| 10,454,791 | B2 | 10/2019 | Crabtree et al. | |
| 2005/0165822 | A1 | 7/2005 | Yeung et al. | |
| 2006/0190378 | A1 | 8/2006 | Szydlo et al. | |

(56) References Cited

U.S. PATENT DOCUMENTS

2007/0012161 A1 1/2007 Lyles
2007/0168370 A1 7/2007 Hardy
2007/0240126 A1 10/2007 Allen
2010/0169237 A1 7/2010 Howard et al.
2010/0223364 A1 9/2010 Wei
2010/0257403 A1 10/2010 Virk et al.
2011/0119613 A1 5/2011 Zhu et al.
2011/0185432 A1 7/2011 Sandoval et al.
2013/0304623 A1 11/2013 Kumar et al.
2013/0347116 A1 12/2013 Flores et al.
2014/0359552 A1 12/2014 Misra et al.
2015/0256475 A1 9/2015 Suman et al.
2016/0006629 A1 1/2016 Tanakiev et al.
2016/0028758 A1 1/2016 Ellis et al.
2016/0140519 A1 5/2016 Trepca et al.
2016/0275123 A1 9/2016 Lin et al.
2017/0032130 A1 2/2017 Joseph Durairaj et al.
2017/0046519 A1 2/2017 Cam et al.
2017/0126712 A1 5/2017 Crabtree et al.
2017/0139763 A1 5/2017 Ellwein
2017/0149802 A1 5/2017 Huang et al.
2017/0220964 A1 8/2017 Datta Ray
2017/0279844 A1 9/2017 Bower et al.
2018/0039890 A1 2/2018 Kim et al.
2018/0124091 A1 5/2018 Sweeney et al.
2018/0288087 A1 10/2018 Hittel et al.

FOREIGN PATENT DOCUMENTS

WO 20150094545 A1 6/2015
WO 2017075543 A1 5/2017

* cited by examiner

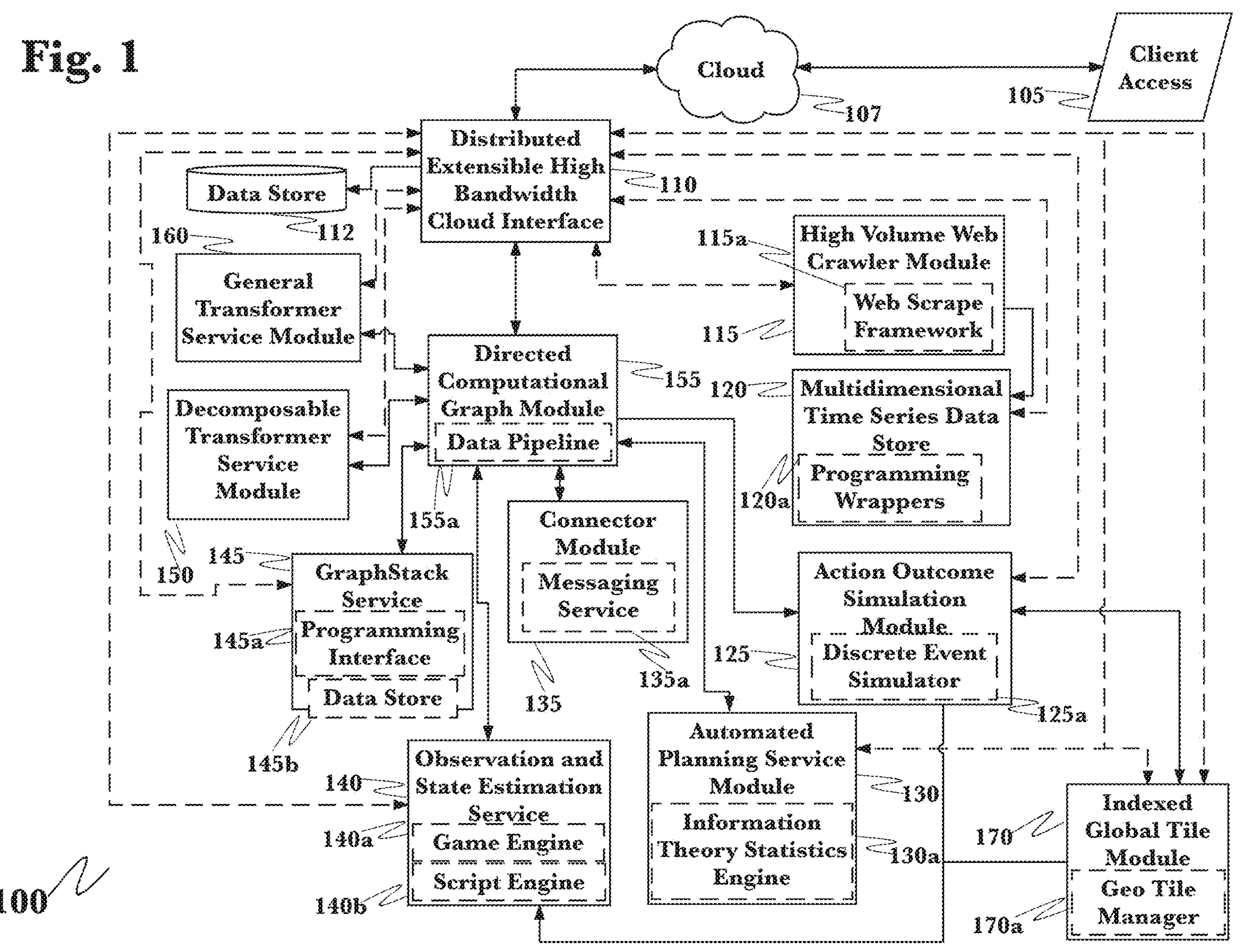
Fig. 1
Client Access
105
Cloud
107
Distributed Extensible High Bandwidth Cloud Interface
110
Data Store
112
High Volume Web Crawler Module
Web Scrape Framework
115
115a
Multidimensional Time Series Data Store
Programming Wrappers
120
120a
Action Outcome Simulation Module
Discrete Event Simulator
125
125a
Automated Planning Service Module
Information Theory Statistics Engine
130
130a
Connector Module
Messaging Service
135
135a
Observation and State Estimation Service
Game Engine
Script Engine
140
140a
140b
GraphStack Service
Programming Interface
Data Store
145
145a
145b
Decomposable Transformer Service Module
150
Directed Computational Graph Module
Data Pipeline
155
155a
General Transformer Service Module
160
Indexed Global Tile Module
Geo Tile Manager
170
170a
100

TIME-SERIES GEOSPATIAL DATA SYSTEM FOR WORLD SIMULATION

CROSS-REFERENCE TO RELATED APPLICATIONS

Priority is claimed in the application data sheet to the following patents or patent applications, each of which is expressly incorporated herein by reference in its entirety:

Ser. No. 18/497,243
Ser. No. 17/106,997
Ser. No. 15/931,534
Ser. No. 16/777,270
Ser. No. 16/720,383
Ser. No. 15/823,363
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 15/683,765
Ser. No. 15/409,510
Ser. No. 15/379,899
Ser. No. 15/376,657
Ser. No. 16/718,906
Ser. No. 15/879,182
Ser. No. 15/850,037
Ser. No. 15/673,368
Ser. No. 15/489,716
Ser. No. 15/905,041
Ser. No. 16/191,054
Ser. No. 16/654,309
Ser. No. 15/847,443
Ser. No. 15/790,457
Ser. No. 62/568,298
Ser. No. 15/790,327
Ser. No. 62/568,291
Ser. No. 16/660,727
Ser. No. 15/229,476

BACKGROUND OF THE INVENTION

Field of the Invention

This disclosure relates to the field of large-scale software services and data management. Specifically, the disclosure relates to providing time-series geospatial data and a world-scale simulation platform for generating simulated-world environments.

Discussion of the State of the Art

Nothing has augmented our ability to gather and store information analogous to the rise of electronic and computer technology. There are sensors of all types to measure just about any condition one may imagine. Computers have allowed the health information for a large portion of the human population to be stored and accessible. Similarly, mass quantities of detailed data concerning the working of government, economics, demographics, climate change and population shifts are all being continuously stored for public analysis and is available via the Internet. Further examples abound, but the point has been made. The meteoric rise of computer networking and the internet has only served to turn the accrual of information into a torrent as now huge populations may exchange observations, data, and ideas, are even invited to do so; vast arrays of sensors may be tied together in meaningful ways all generating data which may be stored for future analysis and use. The receipt and storage of data has gotten to the point where an expert has been quoted as estimating that as much data is currently accrued in two days as was accrued in all history prior to 2003 (Eric Schmidt, Google). While not all of this information would benefit from the ability to either tag the geographical location from which is originated or to add geospatial imagery of the location or region of origin to it, a large proportion would be augmented by such an addition. The addition of either a geographical tag or image specific for its location of origin opens up the possibility of later retrieval of all data, regardless of time collected or event type on the basis of location for inclusion in predictive analytics, allowing the possibility of entirely new and significant outcomes and conclusions to be discovered where such correlations would not have been possible, solely due to geographical tagging or the inclusion of location specific, possibly map overlaid geographical image tiles.

What is needed is a data-dense geographical web-rendering system that can correspond map overlays to data of a plurality of types and subject matter from many heterogeneous sources using a scalable, expressively scriptable, connection interface, which identifies and analyzes a high volume of data, transforming it into a useful format, and allowing the user to perform queries over multiple simulation iterations and variants.

SUMMARY OF THE INVENTION

Accordingly, the inventor has conceived and reduced to practice, a system and method for data-dense geographical regions that correspond to heterogenous sourced data and formats for highly scalable parallel simulations, comprising a multi-dimensional time-series database enabling single-query support over all simulations via individual simulation swimlanes for cyber, physical and cyber-physical entities and regions.

According to a preferred embodiment, a system for data-dense geographical regions that correspond heterogenous sourced data and formats for enabling highly scalable parallel simulations is disclosed, comprising: a computer system comprising a memory and a processor; an indexed geospatial tile module, comprising a first plurality of programming instructions stored in the memory and operating on the processor, wherein the first plurality of programming instructions, when operating on the processor, cause the computer system to: retrieve a plurality of geospatial image tiles corresponding to a geographic region from a plurality of sources; retrieve a plurality of geotagged data corresponding to the geographic region; calculate a geohash for each piece of retrieved geotagged data, wherein a geohash is an encoded geographic location comprising a short string of letters and digits; and overlay the geohash on the corresponding geospatial image tile containing the geographic coordinates of the geohash; a multidimensional time-series database, comprising a second plurality of programming instructions stored in the memory and operating on the processor, wherein the second plurality of programming instructions, when operating on the processor, cause the computer system to: store retrieved data from the indexed geospatial tile module; assign each geographic region and the corresponding retrieved data to a unique swimlane; an action outcome simulation module, comprising a third plurality of programming instructions stored in the memory and operating on the processor, wherein the third plurality of programming instructions, when operating on the processor, cause the computer system to: execute simulations for each unique swimlane in the multidimensional time-series database; and a web-based application interface module, comprising a fourth plurality of programming instructions stored in the memory and operating on the processor, wherein the fourth plurality of programming instructions, when operating on the processor, cause the computer system to: render at least one of the simulations on a web interface; perform at least one query on at least one of the simulations; and retrieve map overlay data for at least one of the simulations.

According to another preferred embodiment, a method for data-dense geographical regions that correspond heterogenous sourced data and formats for enabling highly scalable parallel simulations comprising the steps of: retrieving a plurality of geospatial image tiles corresponding to a geographic region from a plurality of sources; retrieving a plurality of geotagged data corresponding to the geographic region; calculating a geohash for each piece of retrieved geotagged data, wherein a geohash is an encoded geographic location comprising a short string of letters and digits; overlaying the geohash on the corresponding geospatial image tile containing the geographic coordinates of the geohash; storing retrieved data from the indexed geospatial tile module; assigning each geographic region and the corresponding retrieved data to a unique swimlane; executing simulations for each unique swimlane in the multidimensional time-series database; rendering at least one of the simulations on a web interface; performing at least one query on at least one of the simulations; and retrieving map overlay data for at least one of the simulations.

According to various aspects of the invention, the simulations are selected via a web interface; post-simulation data is stored and retrieved for further analysis; geospatial image tiles are vector tiles; the geospatial image tiles are raster tiles; at least of portion of the geospatial tiles correspond to the time progression of the predictive analyses carried out by operating system; the geohashes are hyperlinks to datasets originating from that geographic location; the plurality of geotagged data comprises streaming data from sensors; the system further comprising filters that refine overlay map data, data sets, and data sources; and the system further comprising filters for time-series data.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary and are not intended to limit the scope of the present invention.

FIG. 1 is a diagram of an exemplary architecture of an operating system an indexed global tile module according to an embodiment of the invention.

DETAILED DESCRIPTION OF THE INVENTION

Figure 2:
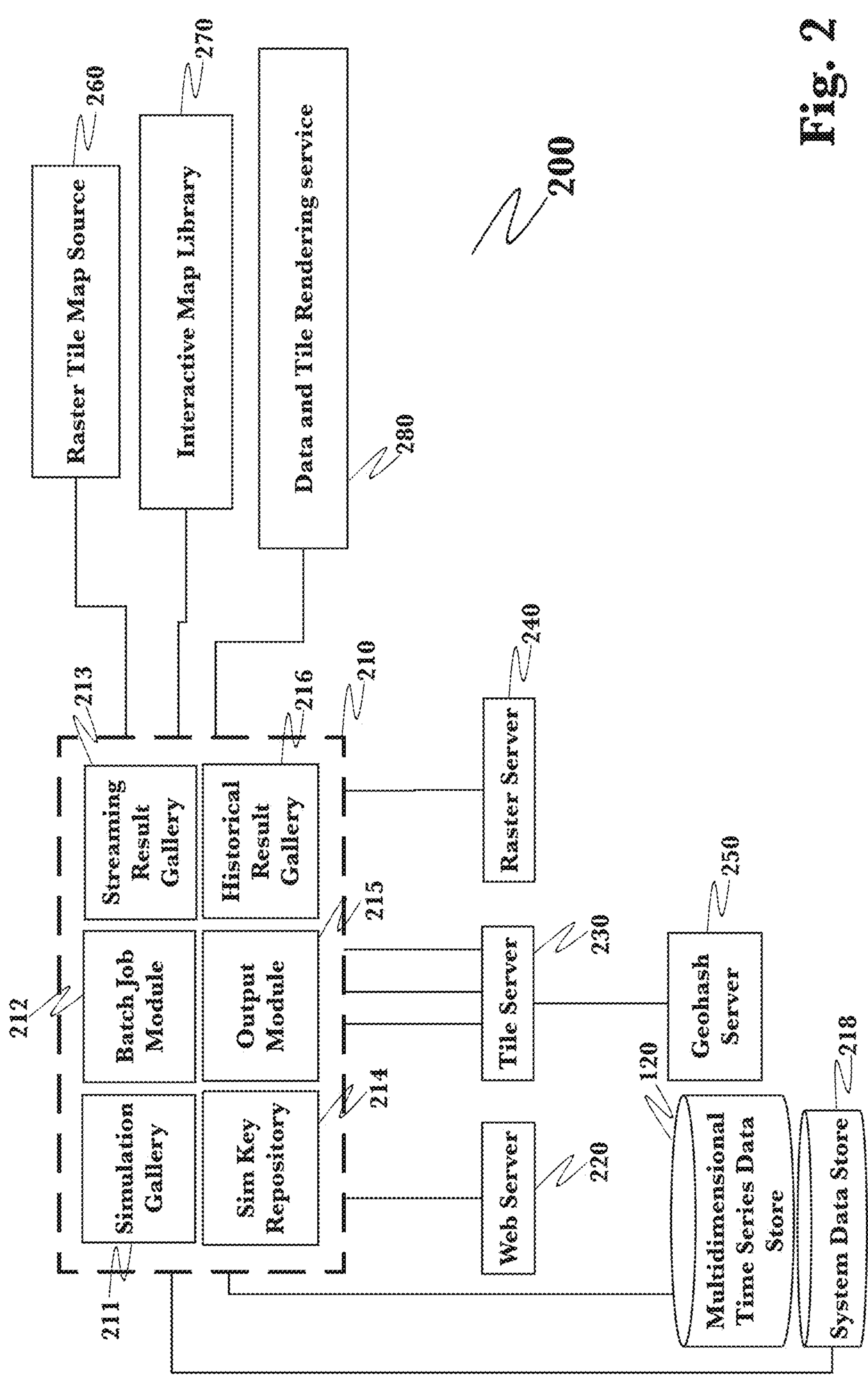
FIG. 2 is a diagram of the web-based application interface for an indexed global tile module as per one embodiment of the invention.

The inventor has conceived and reduced to practice a system and method for data-dense geographical regions that correspond to heterogenous sourced data and formats for highly scalable parallel simulations, comprising a multi-dimensional time-series database enabling single-query support over all simulations via individual simulation swimlanes for cyber, physical and cyber-physical entities and regions.

In a typical embodiment, the operating system, with the inclusion of an indexed global tile module and geospatial tile manager allows both newly accruing data and previously archived data to be during simplest usage tagged with a unique geohash based upon the geographic coordinates of the data's origin or as determined, an indexed geospatial image tile to be attached to the data. Further, map overlays corresponding to the attached indexed geospatial tiles may also be included. Addition of geographical references to both current accruing data and previously archived data then allows inclusion of data from varying times and events previously thought to be unrelated to be predictively analyzed and visualized based on a common location, possibly leading to new highly significant insights and business solutions. Also possible are time series analyses of geospatial image tiles either electronically or by human inspection such as expert analyst or crowdsourcing of those time related images for specific markers or changes related to a specific analysis. The addition of geographical data is expected to augment not only strictly real-world predictive analysis but also simulation analysis of specific decisions which may then be used outright or may be compared, simulated progression to real world observed outcome to measure model assumption accuracy or hard to discern progress of an ongoing business project.

In order to handle the huge amount of data a new system and approach is disclosed whereby a multi-dimensional time-series database (MDTSDB) returns time-series data from a geo-query and the response is converted to a usable format rather than current application that delegate this to a downstream tile server. According to one embodiment, the returned time-series data is converted to JSON, but other formats may be used. Furthermore, Enhancing a MDTSDB with such functionality typically found in a tile server, syntax scripts may be used to allow a web-side flexibility that covers the temporal data requirements. Using a MDTSDB, the disclosed embodiments implements aggregation internally though cross swimlane queries to avoid performance penalties and limitations on large volumes of data.

Additionally, event data may be kept in memory whereby requests for tile data at a particular zoom level, where the response is an array with the position values for leaflet animation step. An animation step is calculated initially and once when requesting for metadata information to a tile server. The step calculation may be composed as follows:

steps=min("frame-count" value, #events/steps returned by metadata tile server)

step=(simulation end−simulation start)/steps

Tile offsets converted by the tile server, and dates are the steps calculated as (Event timestamp-Start simulation timestamp)/Step). The value per step may be contained in the array and this value can for example represent an amount for aggregated data or a category. The system may apply different styles according to this value.

Currently each actor probe has its own MDTSDB swimlane, the tile server queries in parallel for all series in MDTSDB and may perform a postprocessing merge to achieve the required format (as shown above). This is significant for the MDTSDB to support a single query over different swimlanes (i.e., simulations) for each simulation has its own swimlane. Secondly, the system and its embodiments avoid the problem of tile pixel clearing known in the art when a new step is to be rendered. This is particularly useful in city simulations where users may want to use a heat map to visualize the overlay (e.g., residential waste as one example) progress during the simulation steps. The system overcomes this tile pixel clearing limitations by forcing cumulative data aggregation for point data and moving actors (geolocalized actors) using linear data aggregation. Another important improvement is the group by query to pass the cluster factor calculated using the resolution. The system further snaps all points in a geometry (tile bounding box as one example) to a resolution grid and may perform a "countBy" aggregation grouping by timestamp.

Other aspects of embodiments disclosed include a fully integrated system that assigns location or region-specific geographical tags, indexed geospatial image tiles, and corresponding map overlays to data of a plurality of types and subject matter from many heterogeneous sources using a scalable, expressively scriptable, connection interface, identifies and analyzes that high volume data, transforming it into a useful format. The system then uses the geographical data for serving as one characteristic to drive an integrated, highly scalable simulation engine which may employ combinations of the system dynamics, discrete event and agent-based paradigms within a simulation iteration such that useful and accurate data transformations are obtained and stored for the human analysts to rapidly digest the presented information and readily comprehend any predictions or recommendations.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Program functions and capabilities are not always attributed to a named software set or library. This in no instance implies that such a specific program, program function, or code library is not employed but is meant to allow time progression based changes to be made. In all cases at least one open source or proprietary software package providing the attributed functional result may be available and known to those skilled in the art or the algorithm needed to accomplish the function determinable by those skilled in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

Conceptual Architecture

FIG. 1 is a diagram of an exemplary architecture of an operating system including an indexed global tile module 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135*a* needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is not limited to, a plurality of physical sensors, network service providers, web-based questionnaires and surveys, monitoring of electronic infrastructure, crowd sourcing campaigns, and human input device information. Within the directed computational graph module 155, data may be split into two identical streams in a specialized pre-programmed data pipeline 155*a*, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High volume web crawling module 115 uses multiple server hosted preprogrammed web spiders, which while autonomously configured are deployed within a web scraping framework 115*a* of which SCRAPY™ is an example, to identify and retrieve data of interest from web-based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to environmental factors at insured client infrastructure sites, component sensor readings and system logs of all insured client equipment, weather and catastrophic event reports for all regions an insured client occupies, political communiques from regions hosting insured client infrastructure and network service information captures such as, but not limited to news, capital funding opportunities and financial feeds, and sales, market condition and service related customer data. The module is designed to accommodate irregular and high-volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145*a*, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145*a* and stores it in a graph-based data store 145*b* such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130*a* based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

A significant proportion of the data that is retrieved and transformed by an operating system 100, both in real world analyses and as predictive simulations that build upon intelligent extrapolations of real-world data, include a geospatial component. This geospatial component identifies the data source's location such as geotagged photos available on most modern smart phones. This locality metadata is used to calculate geohashes which are then attached to geospatial tiles. The indexed global tile module 170 and its associated geospatial tile manager 170*a* manages externally available, standardized geospatial tiles and may provide other components of an operating system 100 through programming methods to access and manipulate meta-information associated with geospatial tiles and stored by the system. Ability of an operating system 100 to manipulate this component over the time frame of an analysis and potentially beyond such that, in addition to other discriminators, the data is also tagged, or indexed, with their coordinates of origin on the globe, allows the system to better integrate and store analysis specific information with all available information within the same geographical region. Such ability makes possible not only another layer of transformative capability but, may greatly augment presentation of data by anchoring to geographic images including satellite imagery and superimposed maps both during presentation of real-world data and simulation runs. Furthermore, multiple overlays may be used simultaneously by a user or automatically by an operating system 100 to elicit correlations between data and regions and other emergent behavior not typically extractable by conventional means.

According to a preferred embodiment, indexed global tile module 170 may also be responsible for geoindex-based data management, whereby one aspect may be providing a universally unique identifier (UUID) for each "world" allowing it to maintain its own swimlane for geo-data inside its isolated geoindex. Actual underlying data objects referenced by the index are then stored using MDTSDB 120 or AWS™ (Amazon Web Services™) S3 based on the preference of the user and the type of data. Large data and raw data (e.g. satellite imagery, LIDAR data, etc.) may be stored on S3 or other similar cloud data services, while other types of data are persisted in the MDTSDB 120.

A service created by MDTSDB 120 swimlanes for events and sensor data associated with for cyber, physical and cyber-physical entities and regions may also be used to track updates across portions of a particular world's data set. In these cases, indexed global tile module 170 may be responsible for maintaining a record of MDTSDB 120 key pairs associated with data in its geoindex and potentially creating and setting event-condition-action (ECA) rules in MDTSDB 120 for alerting on changes.

Indexed global tile module 170 may provide external applications the ability to run geoqueries to retrieve data and imagery related to a particular spatiotemporal range. One common use case will be loading more detailed imagery to inform rendering of terrain inside a game world where that detailed information is loaded on demand during use when users reach a portion of a map requiring the additional fidelity.

Implementation of the service offered by the operating system 100 may operate as a standalone cluster with RESTful API management endpoints, whereby actual web UI (User Interface) presentation layers include support for 2-Dimensional maps (with time) and 3-Dimensional maps with time. Additionally, the service may handle in-browser rendering of geo-type data for other services—typically simulation software, other data bases, and third-party software.

FIG. 2 is a diagram of the web-based application interface for an indexed global tile module 200 as per one embodiment of the invention. User interaction with the indexed global tile module 170 is mediated through a web-based interface 210. This indexed global tile module web interface 210 may retrieve at least a portion of geospatial data not previously referenced from a plurality of remote, possibly cloud-based sources which include but are not limited to raster tile map sources 260, interactive map libraries 270, and data and tile rendering services 280 which may resolve business decision data onto a geographical location or region. Other services known to those skilled in the field may exist and be used as needed.

Direct interaction between the function of the operating system 100 and the capabilities of the indexed global tile module may pertain to both real world analyses and simulations run by the system. The web application therefore keeps galleries for simulations 211, streaming analyses results 213, and historical analyses results 216 which allows web-based application users to retrieve these records from system data stores. This may include multidimensional time series data store 120 for analyses involving series of repeated sensor readings or repeated updates of highly similar data or other similar data series of short to moderate amounts of information and other system associated data stores 218 for analyses of more extensive freeform text or similar data records. Once a simulation or real-world analysis is chosen, users may add simple geospatial information to them such as a unique geohash, calculated within the geohash server 250 that is based upon the geographical coordinates where the data originated that then allows the simulation or real world analysis to be correlated with other analyses within a pre-determined location radius based upon those geohashes which have increasing similarity based upon increased proximity. Geohashes may in some aspects use sets of keywords, typically three (such as "cat-dog-bear") that identify specific geospatial features in a local area, such as specific buildings in an urban built-up area. In such aspects, a set of geospatial coordinates may identify a location of a user (for example, of a mobile device, using global positioning system GPS), and the user's location may provide context from which the geohash server can use a set of predefined keywords specific to a location close to the location of the user, in order to provide a human-usable geohashing system for users in specific local areas. Addition of complex geospatial information such as detailed indexed time corrected geospatial tile images or fully user annotated, labelled time corrected geospatial tile series 260 with map overlays 270 for the length of the analysis, depending on the requirements of the study being carried out. To allow modification of running simulations, the web app must be capable of supplying the key for the correct, desired simulation and therefore keeps a repository of those keys 214.

A plurality of jobs run by the indexed global tile module require both a large amount of resources and of time to complete and may therefore be run as batch jobs 212. All output from the manipulation done by the web application may be mediated by the output module. The web application is hosted on a web server 220. Indexed geospatial tiles are retrieved from at least one tile server which may be local, or cloud based 230. Geohashes are calculated from specific tiles of interest 250. Tiles and map overlays may be rasterized for output by a raster server 240.

Figure 3:
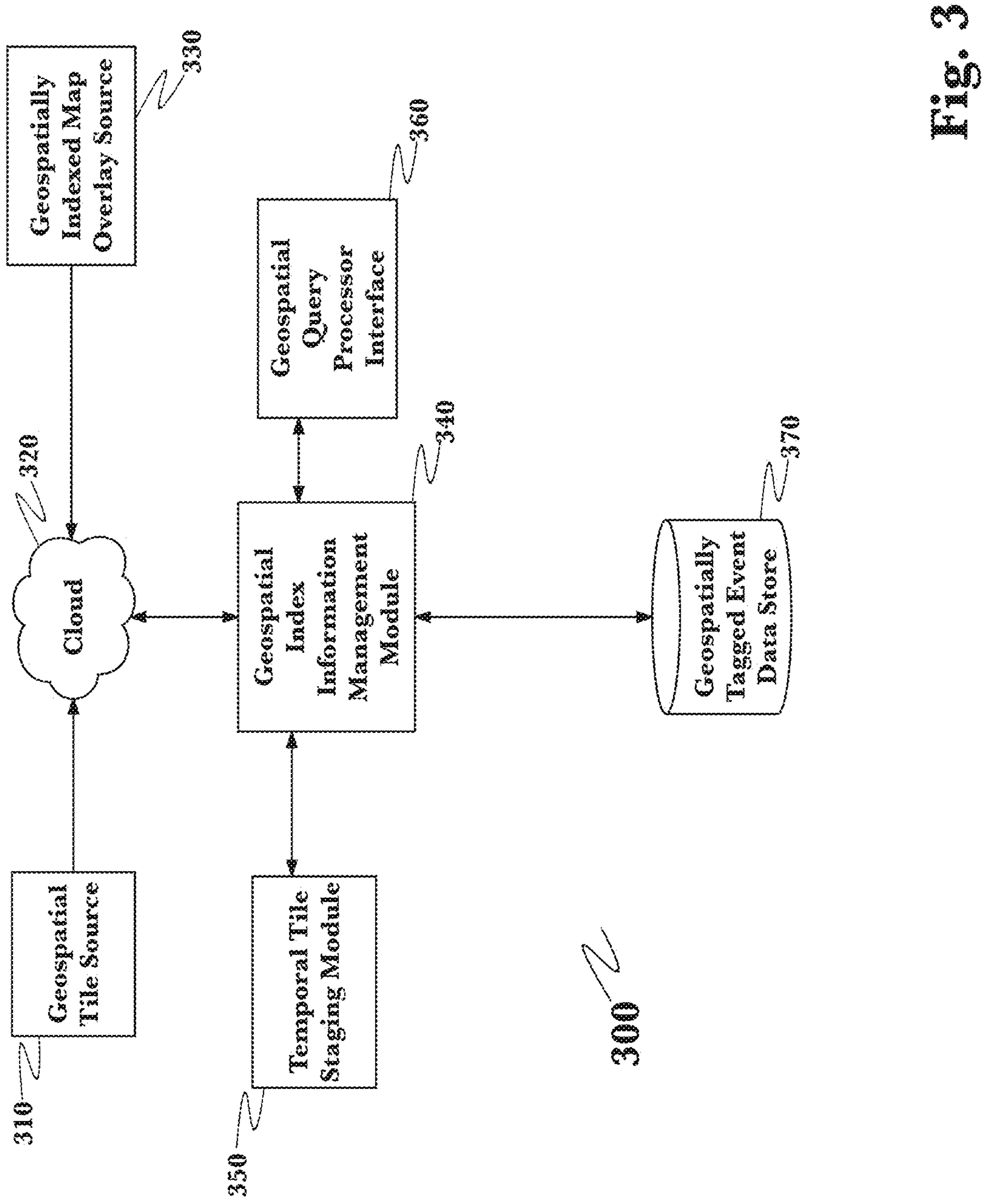
FIG. 3 is a diagram of an indexed global tile module as per one embodiment of the invention

FIG. 3 is a diagram of an indexed global tile module 300 as per one embodiment of the invention. A significant amount of the data transformed and simulated by the operating system has an important geospatial component. The indexed global tile module 170 allows both for the geotagged storage of data as retrieved by the system as a whole and for the manipulation and display of data using their geological data to augment the data's usefulness in transformation, for example creating ties between two independently acquired data points to more fully explain a phenomenon or in the display of real world or simulated results in their correct geospatial context for greatly increased visual comprehension and memorability.

The indexed global tile module 170 may consist of a geospatial index information management module which retrieves indexed geospatial tiles from a cloud-based 320 source known to those skilled in the art and may also retrieved available geospatially indexed map overlays 310 for geospatial tiles 320 from a cloud-based source known to those skilled in the art. Tiles and their overlays, once retrieved, represent large amounts of potentially reusable data and are therefore stored for a pre-determined amount of time to allow rapid recall during one or more analyses on the system 350. To be useful it is required that both the transformative modules of the operating system, such as, but not limited to the directed computational graph module 155, and the automated planning service module 130, as well as the action outcome simulation module 125 and observational and state estimation service 140 for display functions be capable of both accessing and manipulating the retrieved tiles and overlays. A geospatial query processor interface serves as a program interface between these system modules and the geospatial index information management module 340 which fulfills the resource requests through specialized direct tile manipulation protocols, which, as a simplistic example, may include "get tile xxx," "zoom," "rotate," "crop," "shape," "stitch," and "highlight" just to name a very few options known to those skilled in the art.

During analysis, the geospatial index information management module may control the assignment of geospatial data and the running transformative functions to one or more swimlanes to expedite timely completion and correct storage of the resultant data with associated geotags. The transformed tiles with all associated transformation tagging may be stored for future review 370. Alternatively, just the geotagged transformation data or geotagged tile views may be stored 370 for future retrieval of the actual tile and review depending on the need and circumstance. There may also be occasion where time series data from specific geographical locations are stored in the multidimensional time series data store 120 with geo-tags provided by the geospatial index information management module 340.

As one example, consider a global food distribution company that is attempting to find more efficient ways to predict and meet supply and demand. The food distribution company would use an operating system to run simulations in order to find emergent patterns of shoppers and logistical recommendations for distribution. More specifically, an operating system would ingest and integrate data of grocery store customers over a number of years, along with markets, weather, political, and social data with reference to geospatial data and other map data (such as driving time or traffic patterns) attributes. Further add in internal logistics variables and the simulations begin to visualize large-scale trends and opportunities. If demand for a product in Europe typically begins during a season change for example, but requires goods originating from South America a season behind, there are a slew of periodic and aperiodic logistical hurdles.

Companies typically already work out the periodic hurdles, but those plans are interrupted by socioeconomic events that introduce the aperiodic hurdles that damage a company's bottom line. The integration of geospatial data with other data sources while simulating and visualizing such logistical complexities is one example of the use of an operating system with an indexed global tile module.

Figure 4:
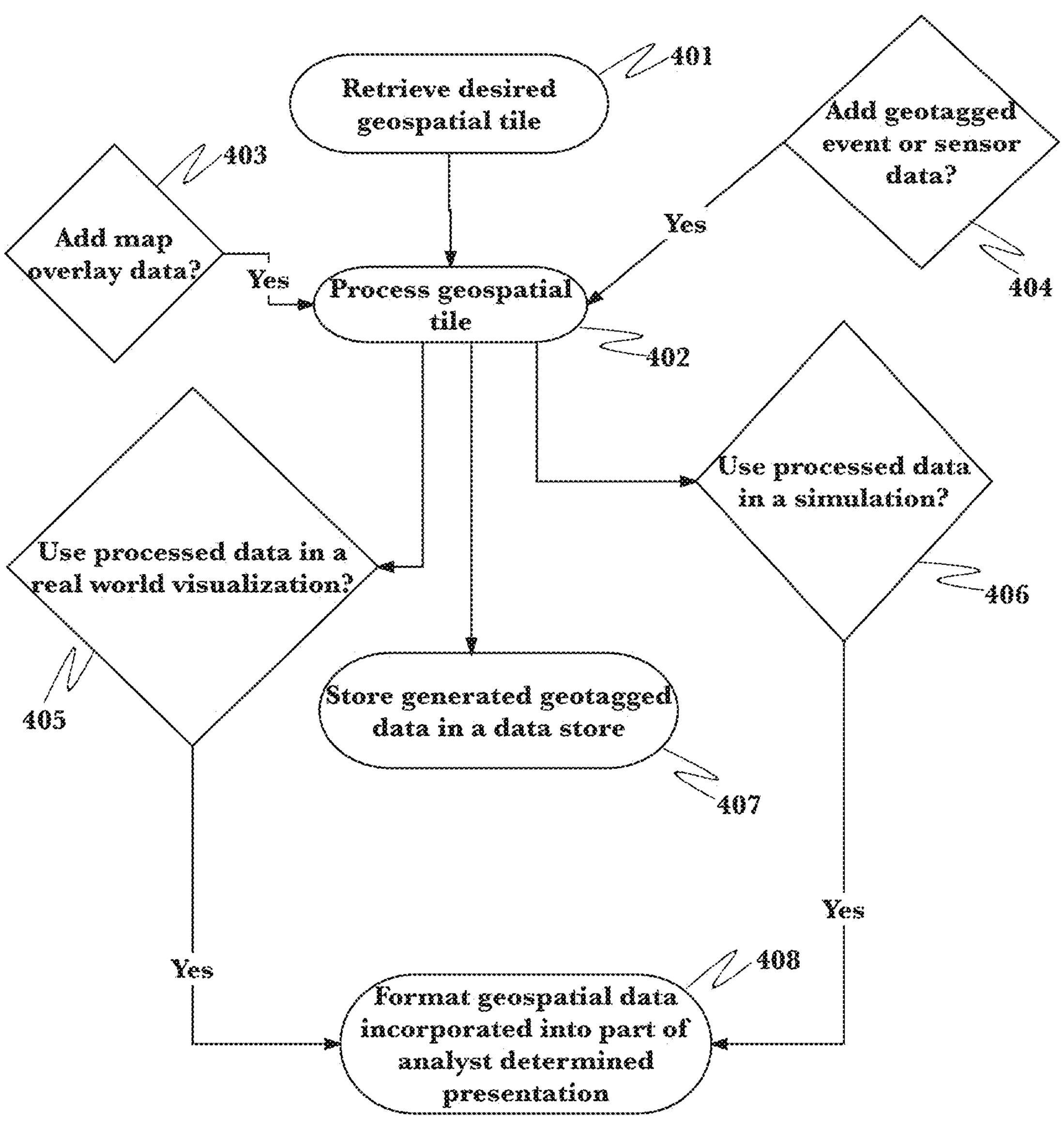
FIG. 4 is a flow diagram illustrating the function of the indexed global tile module as per one embodiment of the invention.

FIG. 4 is a flow diagram illustrating the function of the indexed global tile module 400 as per one embodiment of the invention. Predesignated, indexed geospatial tiles are retrieved from sources known to those skilled in the art 401. Available map overlay data retrieved from one of multiple sources 403 known to those skilled in the art may be retrieved per user design. The geospatial tiles may then be processed in one or more of a plurality of ways according to the design of the running analysis 402, at which time geo-tagged event or sensor data may be associated with the indexed tile 404 which may be directed programmatically or as a result of user interaction through a web application 210. Geo-tagging, either interactive 200 or programmatic, may be applied to data at or near real time or applied to transformed data that has been previously archived to augment those data alone for direct presentation or further self-contained analysis, or may be applied to augment the data so as to allow their inclusion in subsequent predictive analyses on the basis of their geographical location of occurrence in larger location based or regionally based analyses with either other archival or real time data, or both. Data relating to tile processing, which may include the tile itself is then stored for later review or analysis 407. The geo-data, in part, or in its entirety may be used in one or more transformations that are part of a real world data presentation 405. The geo-data in part of in its entirety may be used in one or more transformations that are part of a simulation 406. At least some of the geospatial data may be used in an analyst determined direct visual presentation or may be formatted and transmitted for use in third party solutions 408.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
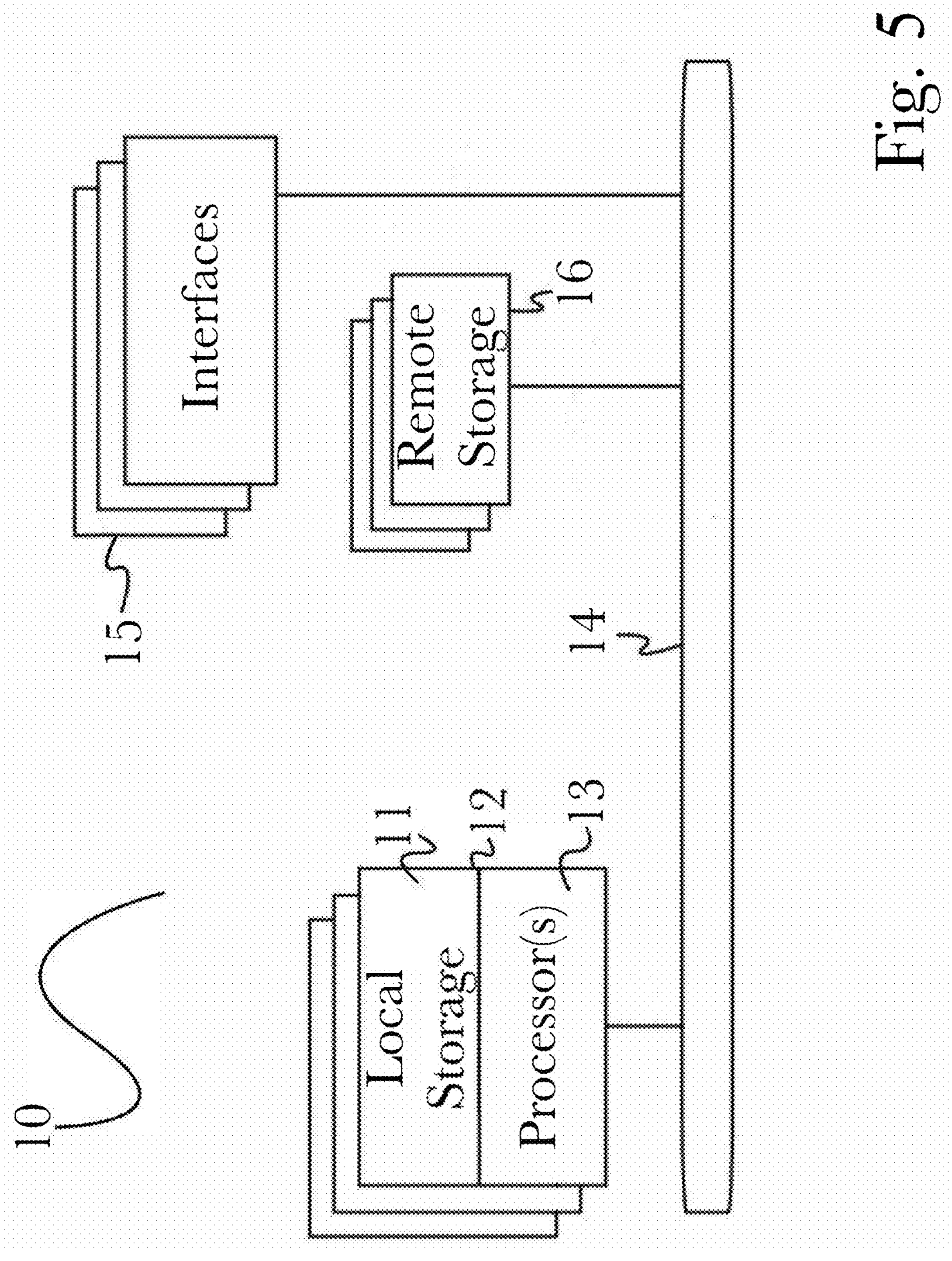
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
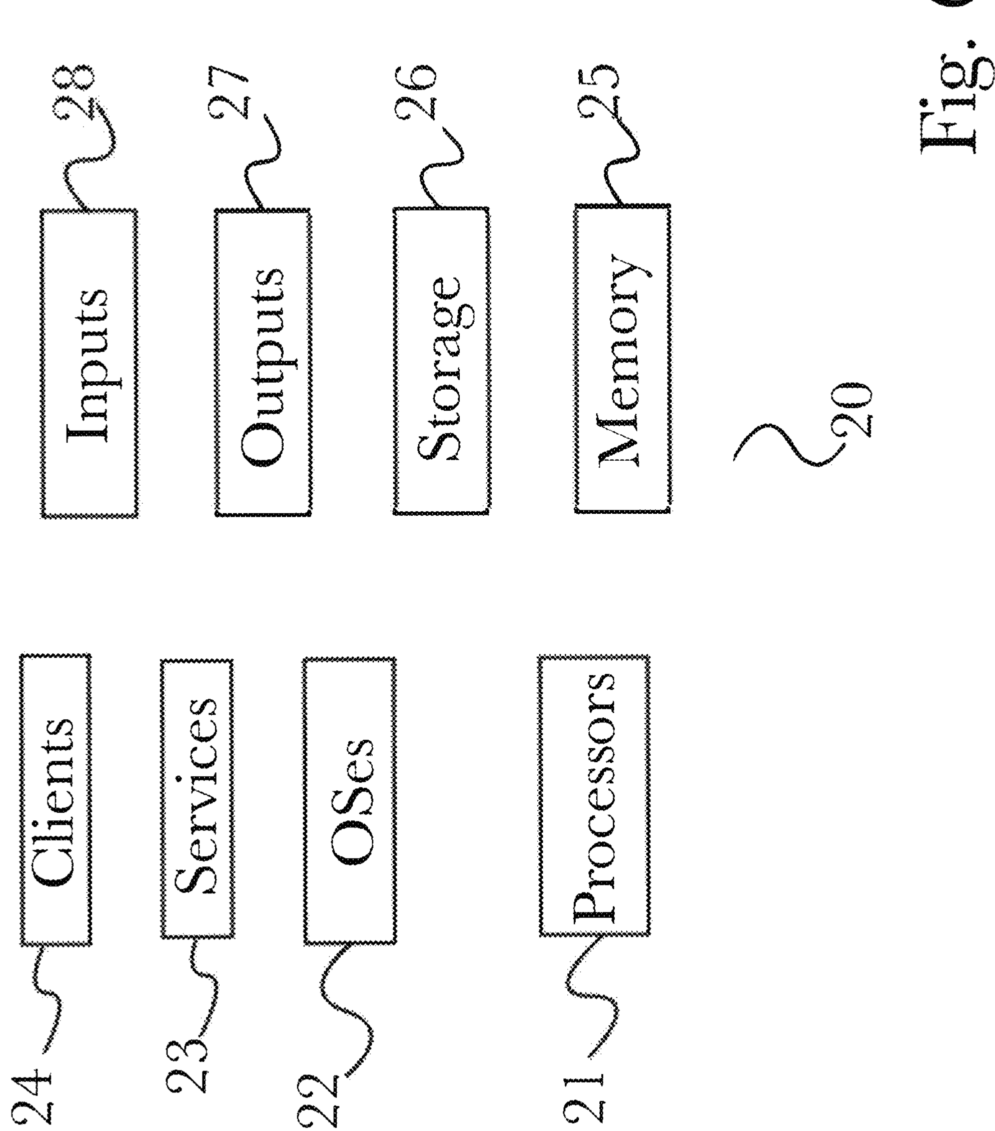
FIG. 6 is a block diagram illustrating an exemplary logical architecture for a client device, according to various embodiments of the invention.

In some embodiments, systems according to the present invention may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 7:
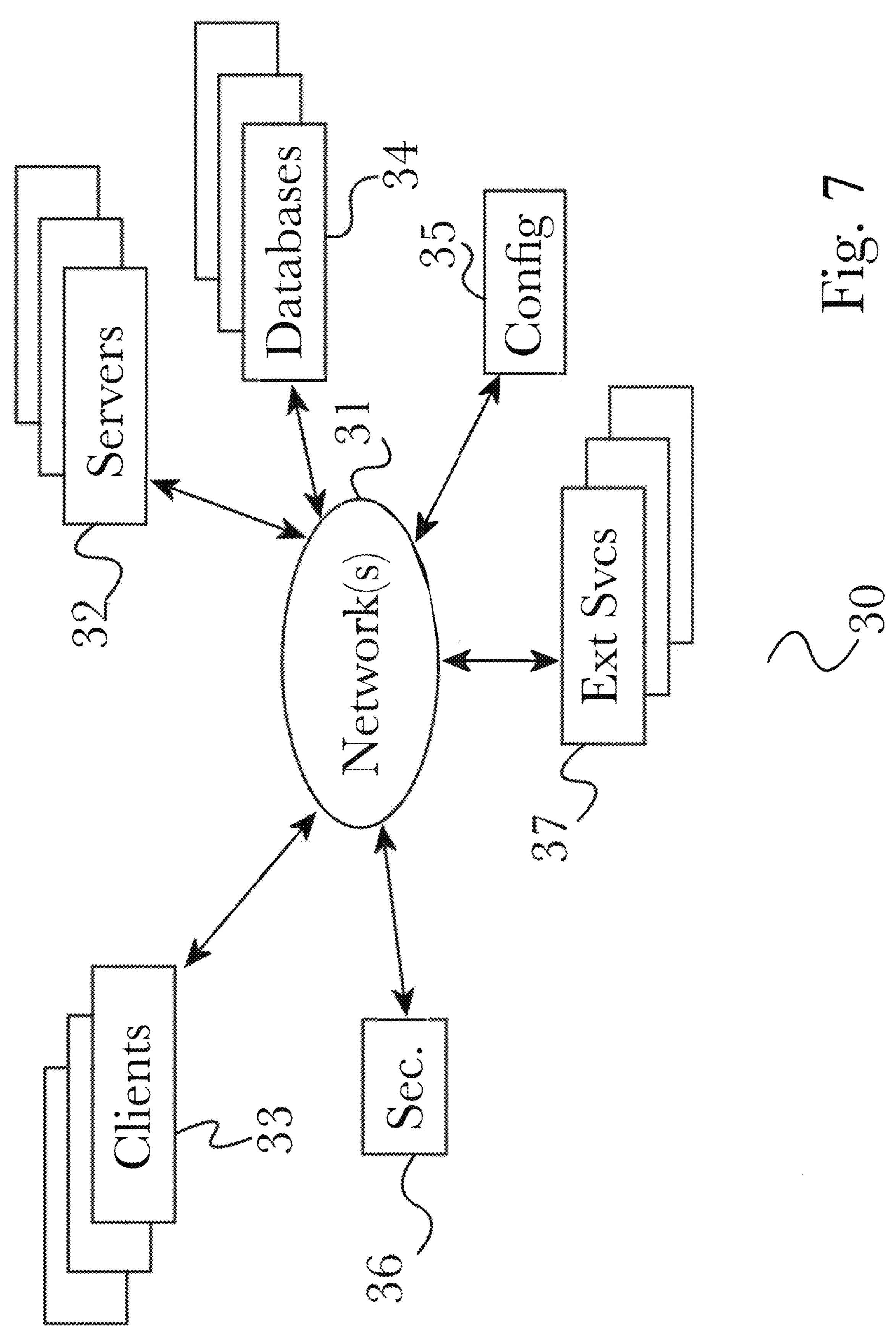
FIG. 7 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 7, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 8:
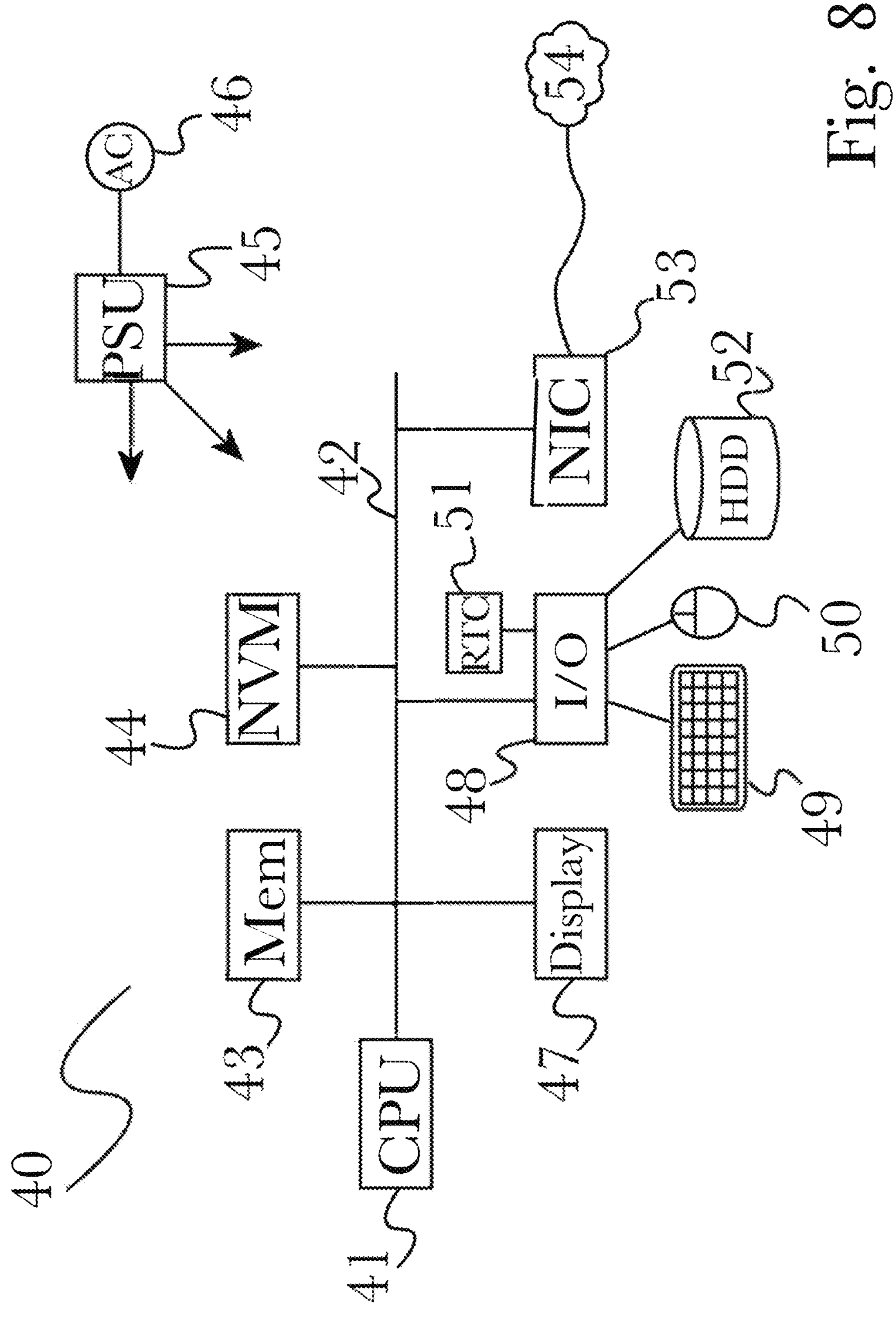
FIG. 8 is another block diagram illustrating an exemplary hardware architecture of a computing device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The geospatial labelling platform described here is built upon highly programmable computer software architecture that may serve as the basis of a plurality of specific use systems. For example the architecture and base programming described here 100 being employed as an trading decision platform 200 is the same computer architecture described in ¶032 and ¶033 of co-pending application Ser. No. 15/237,625 and specifically used as a cyber-attack detection mitigation and remediation platform in ¶035 through ¶037 of co-pending application Ser. No. 15/237,625 all of which may benefit from the inclusion of geographical location data in way evident to those skilled in the art. The same base architecture and programming, presented here and previously and designed to be readily augmented by application specific data stores and programming may take on the capabilities or personalities of a plurality of highly advanced platforms in a plurality of fields both business and scientific where large volumes of data, at least a portion of which may enter the system in bursts or at irregular intervals is present and data which may need normalization and transformation as well as correlation of possibly hard to discern commonalities. Again, the ability by the system to retrieve and include geospatial data even in the most simplistic addition of geohashes may greatly benefit achievement of progress in a number of the mentioned areas. The personality instilled platform may also be used in these fields to perform reliable analytics and run reliable simulations on the existing data to allow operators to intelligently determine next direction to implement (and which next direction potentially not to implement) potentially saving both time, money and resources. In summary, the operating system disclosed here, now with the addition of a mechanism to process geographical data and add it to both currently accruing and archival data and in co-pending applications may be imagined more as a set of software engineered stations in a highly and readily modifiable virtual production line than as only a cyber-attack detection, mitigation and remediation system or as only and trading decision platform as it is both and may be more.

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A computing system for data-dense geographical regions using heterogenous source data and formats for enabling highly scalable parallel world simulations, comprising:

a computer system comprising a memory and a processor;

a plurality of instructions that, when operating on the processor, cause the computer system to:

retrieve a plurality of geospatial data for a geographic region, wherein the geospatial data includes both real-world geospatial data and simulated geospatial data;

assign a unique identifier for each of one or more portions of the geospatial data, wherein each unique identifier is associated with a particular digital world of a plurality of digital worlds;

store the geospatial data and the associated unique identifiers in a multidimensional time-series database, wherein the multidimensional time-series database is structured based on the plurality of digital worlds;

assign the geospatial data to distinct processing units based on the unique identifiers associated with the geospatial data to execute a plurality of simulations, wherein one or more of the plurality of simulations are each associated with a different digital world;

execute the plurality of simulations for each processing unit using the geospatial data from the multidimensional time-series database;

render results from the plurality of simulations to a user interface; and perform queries across the results from the plurality of simulations.

2. The system of claim 1, wherein the location identifier comprises keywords identifying a specific location.

3. The system of claim 1, wherein the geospatial data includes vector data.

4. The system of claim 1, wherein the geospatial data includes raster tiles.

5. The system of claim 1, wherein at least some of the geospatial data represents time-progressive analyses.

6. The system of claim 1, wherein the location identifiers link to additional datasets.

7. The system of claim 1, wherein the geospatial data includes sensor data.

8. The system of claim 1, further comprising filters for refining data.

9. The system of claim 8, wherein the filters apply to time-series data.

10. A computer-implemented method for data-dense geographical regions using heterogenous source data and formats for enabling highly scalable parallel world simulations, the computer-implemented method comprising:

retrieving a plurality of geospatial data for a geographic region, wherein the geospatial data includes both real-world geospatial data and simulated geospatial data;

assigning a unique identifier for each of one or more portions of the geospatial data, wherein each unique identifier is associated with a particular digital world of a plurality of digital worlds;

storing the geospatial data and the associated unique identifiers in a multidimensional time-series database, wherein the multidimensional time-series database is structured based on the plurality of digital worlds;

assigning the geospatial data to distinct processing units based on the unique identifiers associated with the geospatial data to execute a plurality of simulations, wherein one or more of the plurality of simulations are each associated with a different digital world;

executing the plurality of simulations for each processing unit using the geospatial data from the multidimensional time-series database;

rendering results from the plurality of simulations to a user interface; and performing queries across the results from the plurality of simulations.

11. The computer-implemented method of claim 10, wherein the location identifier comprises keywords identifying a specific location.

12. The computer-implemented method of claim 10, wherein the geospatial data includes vector data.

13. The computer-implemented method of claim 10, wherein the geospatial data includes raster data.

14. The computer-implemented method of claim 10, wherein at least some of the geospatial data represents time-progressive analyses.

15. The computer-implemented method of claim 10, wherein location identifiers link to additional datasets.

16. The computer-implemented method of claim 10, wherein the geospatial data includes sensor data.

17. The computer-implemented method of claim 10, further comprising applying filters to refine data.

18. The computer-implemented method of claim 17, wherein the filters apply to time-series data.

19. A system for data-dense geographical regions using heterogenous source data and formats for enabling highly scalable parallel world simulations, comprising:

a computing system comprising a processor and a memory, configured to:

retrieve a plurality of geospatial data for a geographic region, wherein the geospatial data includes both real-world geospatial data and simulated geospatial data;

assign a unique identifier for each of one or more portions of the geospatial data, wherein each unique identifier is associated with a particular digital world of a plurality of digital worlds;

store the geospatial data and the associated unique identifiers in a multidimensional time-series database, wherein the multidimensional time-series database is structured based on the plurality of digital worlds;

assign the geospatial data to distinct processing units based on the unique identifiers associated with the geospatial data to execute a plurality of simulations, wherein one or more of the plurality of simulations are each associated with a different digital world;

execute the plurality of simulations for each processing unit using the geospatial data from the multidimensional time-series database;

render results from the plurality of simulations to a user interface; and perform queries across the results from the plurality of simulations.

20. The system of claim 19, wherein the location identifier comprises keywords identifying a specific location.

21. The system of claim 19, wherein the geospatial data includes vector data.

22. The system of claim 19, wherein the geospatial data includes raster data.

23. The system of claim 19, wherein at least some of the geospatial data represents time-progressive analyses.

24. The system of claim 19, wherein location identifiers link to additional datasets.

25. The system of claim 19, wherein the geospatial data includes sensor data.

26. The system of claim 19, further comprises applying filters to refine data.

27. The system of claim 26, wherein the filters apply to time-series data.

28. Non-transitory, computer-readable storage media having computer-executable instructions embodied thereon that, when executed by one or more processors of a computing system for enabling highly scalable parallel world simulations, cause the computing system to:

retrieve a plurality of geospatial data for a geographic region, wherein the geospatial data includes both real-world geospatial data and simulated geospatial data;

assign a unique identifier for each of one or more portions of the geospatial data, wherein each unique identifier is associated with a particular digital world of a plurality of digital worlds;

store the geospatial data and the associated unique identifiers in a multidimensional time-series database, wherein the multidimensional time-series database is structured based on the plurality of digital worlds;

assign the geospatial data to distinct processing units based on the unique identifiers associated with the geospatial data to execute a plurality of simulations, wherein one or more of the plurality of simulations are each associated with a different digital world;

execute the plurality of simulations for each processing unit using the geospatial data from the multidimensional time-series database;

render results from the plurality of simulations to a user interface; and perform queries across the results from the plurality of simulations.

29. The non-transitory, computer-readable storage media of claim 28, wherein the location identifier comprises keywords identifying a specific location.

30. The non-transitory, computer-readable storage media of claim 28, wherein the geospatial data includes vector data.

31. The non-transitory, computer-readable storage media of claim 28, wherein the geospatial data includes raster data.

32. The non-transitory, computer-readable storage media of claim 28, wherein at least some of the geospatial data represents time-progressive analyses.

33. The non-transitory, computer-readable storage media of claim 28, wherein location identifiers link to additional datasets.

34. The non-transitory, computer-readable storage media of claim 28, wherein the geospatial data includes sensor data.

35. The non-transitory, computer-readable storage media of claim 28, further comprises applying filters to refine data.

36. The non-transitory, computer-readable storage media of claim 35, wherein the filters apply to time-series data.

* * * * *